United States Patent
Tsuji

(10) Patent No.: US 10,263,891 B2
(45) Date of Patent: Apr. 16, 2019

(54) SWITCHING DEVICE, COMPUTER SYSTEM, METHOD, AND PROGRAM

(71) Applicant: NEC Corporation, Tokyo (JP)

(72) Inventor: Akira Tsuji, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 74 days.

(21) Appl. No.: 15/318,835

(22) PCT Filed: Jun. 16, 2015

(86) PCT No.: PCT/JP2015/067264
§ 371 (c)(1),
(2) Date: Dec. 14, 2016

(87) PCT Pub. No.: WO2015/194534
PCT Pub. Date: Dec. 23, 2015

(65) Prior Publication Data
US 2017/0118115 A1    Apr. 27, 2017

(30) Foreign Application Priority Data
Jun. 17, 2014 (JP) .................................. 2014-124214

(51) Int. Cl.
*H04L 12/741* (2013.01)
*G06F 13/14* (2006.01)
(Continued)

(52) U.S. Cl.
CPC ............ *H04L 45/745* (2013.01); *G06F 13/14* (2013.01); *G06F 13/36* (2013.01); *H04L 12/44* (2013.01);
(Continued)

(58) Field of Classification Search
USPC ........................................................ 370/392
See application file for complete search history.

(56) References Cited

U.S. PATENT DOCUMENTS

2012/0093155 A1* 4/2012 Poddar .................... H04L 69/22
370/392
2013/0170354 A1 7/2013 Takashima et al.
2014/0016648 A1 1/2014 Hidaka

FOREIGN PATENT DOCUMENTS

| JP | 2011-254378 A | 12/2011 |
|---|---|---|
| WO | 2012/033041 A1 | 3/2012 |
| WO | 2012/128282 A1 | 9/2012 |

OTHER PUBLICATIONS

Sangjin Han, et al., "Network Support for Resource Disaggregation in Next-Generation Datacenters", Nov. 2013, 7 pages, (URL:http://conferences.sigcomm.org/hotnets/2013/papers/hotnets-final40.pdf).
(Continued)

*Primary Examiner* — Kouroush Mohebbi
(74) *Attorney, Agent, or Firm* — Sughrue Mion, PLLC

(57) ABSTRACT

Provided is a switching apparatus including a processor that allows the switching apparatus to function as: an analysis unit that is configured to extract a header of a received packet and to acquire information of the header; a determination unit that is configured to determine an operation for the packet according to information of a type, request source, and destination of a request included in the header; and an execution unit including a means that is configured to execute, in accordance with the determined operation, at least one of processing for responding to the request included in the packet, processing for rewriting the packet, and processing for transmitting the packet.

9 Claims, 14 Drawing Sheets

(51) Int. Cl.
*G06F 13/36* (2006.01)
*H04L 12/44* (2006.01)
*H04L 12/947* (2013.01)
*H04L 12/931* (2013.01)
*H04L 29/06* (2006.01)

(52) U.S. Cl.
CPC .............. *H04L 49/25* (2013.01); *H04L 49/70* (2013.01); *H04L 69/22* (2013.01)

(56) References Cited

OTHER PUBLICATIONS

International Search Report for PCT/JP2015/067264 dated Sep. 1, 2015 [PCT/ISA/210].
Written Opinion for PCT/JP2015/067264 dated Sep. 1, 2015 [PCT/ISA/237].

* cited by examiner

Fig. 7

| Request Type (Fmt + Type) | Requester ID | Destination (Memory Range or BDF#) | Action ID |
|---|---|---|---|
| Memory Read | X | 0x11223344 | 1 |
| I/O Read | Y | 0xaabbccdd | 2 |

SWITCHING DEVICE, COMPUTER SYSTEM, METHOD, AND PROGRAM

REFERENCE TO RELATED APPLICATION

This application is a National Stage of International Application No. PCT/JP2015/067264, filed on Jun. 16, 2015, which claims priority from Japanese patent application No. 2014-124214 (filed on Jun. 17, 2014), the contents of which are hereby incorporated by reference in their entirety as if fully set forth herein.

TECHNICAL FIELD

The present invention relates to a switching apparatus, a computer system, a method, and a program.

BACKGROUND ART

A technique that can extend an I/O fabric, of a computer, which is realized using printed wiring on a board (e.g. a mother board) mounted with a CPU (Central Processing Unit), a memory, an I/O (Input/Output) bus, and the like configuring the computer, to the outside of a housing of the computer by use of a network cable and a network switch is emerging.

An I/O device enclosure box for mounting a GPU (Graphics Processing Unit) connected to PCI (Peripheral Component Interconnect)-Express (PCI-Express is a registered trademark of PCI-SIG) and an I/O device such as an NIC (Network Interface Card) and the like is known (e.g. the Internet URL: http://www.magma.com/). In the I/O device enclosure box, an I/O fabric of PCI-Express is extended from a computer to the outside of the chassis by use of a dedicated I/O card and a cable, and the cable and the I/O device enclosure box are connected. By this, the I/O device disposed at a point physically distant from the housing of the computer can be used from the computer. In this product, a signal flowing through the cable conforms to specifications of PCI-Express. Further, a distance between the housing of the computer and the I/O device enclosure box is several meters. Therefore, the extent of connection in a server rack (e.g. a 19-inch rack of EIA (Electronic Industries Alliance) Standards: width per stage: 19 inches, height is specified by multiples of 1.75 inches. A unit of 1U is defined by 1.75 inches.) is a reachable distance.

Further, a product (e.g. ExpEther), which uses Ethernet (registered trademark) for connection between a computer and an I/O device enclosure box, is known (e.g. the Internet URL: http://www.nec.co.jp/products/workstation/solution/expether/). In this product, a signal of PCI-Express (registered trademark) is encapsulated by an Ethernet (registered trademark) packet, and thereby it is possible to extend a physical distance between a housing of a computer and an I/O device enclosure box to a distance (up to kilometer units) specified by specifications of Ethernet (registered trademark) using an Ethernet (registered trademark) cable and an Ethernet (registered trademark) switch.

In the above-described product or the like, the Ethernet (registered trademark) switch is used for connecting mainly the I/O device enclosure box and the computer. To be more accurate, the switch is used for connecting a root complex and an endpoint (in PCI-Express (registered trademark), an I/O device is referred to as an "endpoint") in a PCI-Express (registered trademark) fabric.

On the other hand, computers can also be connected by use of a non transparent bridge (NTB). The NTB connects root complexes in a PCI-Express (registered trademark) fabric directly or via a PCI-Express (registered trademark) switch and a PCI-Express (registered trademark) bridge. The root complex is a device located in a root (the root of a hierarchy) of a PCI-Express (registered trademark) fabric within a computer. The root complex includes a PCI-Express (registered trademark) port and a host bridge and provides an interface for accessing an I/O device within the PCI-Express (registered trademark) fabric from a CPU.

The NTB appears as an endpoint from each CPU (or root complex). The NTB provides an interface used in data forwarding and the like for each CPU. The NTB executes, via the interface, processing for converting information indicating a transmission destination of data being transmitted from one CPU, and for transmitting the data to the other CPU.

When the above-described related techniques are used, it is possible to divide a server placed in a datacenter into resource units such as a CPU, a memory, an I/O device, and the like, and realize a resource-separated datacenter in which the resource units are flexibly connected via a network (see, for example, NPL 1).

In a product (e.g. ExpEther) using Ethernet (registered trademark) for connecting a computer and an I/O device enclosure box, the I/O device enclosure box and the computer are configured to include I/O interfaces corresponding to the product, respectively. Each I/O interface is assigned with a MAC (Media Access Control) address. When the I/O device arranged in the I/O device enclosure box or the computer transmits a signal of PCI-Express (registered trademark), the I/O interface encapsulates the signal of PCI-Express (registered trademark) using an Ethernet (registered trademark) packet. At that time, a MAC address of an I/O interface included in an I/O device enclosure box or a computer to be a transmission destination of the signal of PCI-Express (registered trademark) is set for a destination MAC address included in the Ethernet (registered trademark) packet, and the MAC address of the own I/O interface is set for the transmission source MAC address.

The encapsulated signal of PCI-Express (registered trademark) flows on Ethernet (registered trademark) on the basis of the MAC address and is delivered to the I/O interface indicated by the destination MAC address.

In the destination I/O interface, the signal of PCI-Express (registered trademark) is extracted (decapsulated) from the Ethernet (registered trademark) packet, and the signal of PCI-Express (registered trademark) is finally delivered to the I/O device or the computer.

In the product in which Ethernet (registered trademark) is used for connecting a computer and an I/O device enclosure box, connection between the I/O device enclosure box and the computer is controlled by use of a VLAN (Virtual Local Area Network). An I/O device enclosure box having a VLAN ID matched with that of a computer is treated as an I/O device enclosure box capable of using the computer.

PTL 1 discloses a configuration for solving a problem that to construct a large number of VLANs on a network, a cost increases according to addition of network devices and the like. PTL 1 discloses a switching apparatus including a plurality of ports, the apparatus including a switch information storage unit that stores an output port identifier for a combination of an input port identifier, an input virtual path identifier, and a transmission destination address; a detection unit that detects a first input virtual path identifier and a first transmission destination address provided for an input packet; a retrieval unit that retrieves a first output port identifier from the switch information storage unit on the basis of a first input port identifier for identifying a port to which the input packet is input, the first input virtual path identifier, and the first transmission destination address; and a packet switch unit that forwards the input packet to a port identified by the first output port identifier.

PTL 2 discloses a switch node in which a plurality of CPUs and a plurality of extended NW IFs are connected using a multi-root compatible PCI-Express (PCIe) switch, a switch port based on a plurality of extended network interfaces (NW IFs) is configured, and a large-capacity flow table is configured using a software-based switch node.

CITATION LIST

Patent Literature

[PTL 1] Japanese Laid-open Patent Publication No. 2011-254378
[PTL 2] International Publication No. WO2012/128282

Non Patent Literature

[NPL 1] Sangjin Han et al., "Network Support for Resource Disaggregation in Next-Generation Datacenters", November, 2013, [retrieved on May 12, 2014], the Internet (URL: http://conferences.sigcomm.org/hotnets/2013/papers/hotnets-final40.pdf)

SUMMARY OF INVENTION

Technical Problem

The following analysis has been provided by the present invention.

In the above-described related techniques, there is a problem that flexibility of an I/O fabric to connect resources configuring a computer is declined. The reason is as follows.

In the above-described PCI-Express (registered trademark), when root complexes are connected, an NTB is necessary. Assuming a datacenter in which resources configuring a computer are divided and the divided resources are connected through an IO fabric, as illustrated, for example, in NPL 1. When such a datacenter is realized, an NTB needs to be included in the I/O fabric. When root complexes are connected, an I/O fabric is controlled to be routed through the NTB. Thereby, path control or the like of the I/O fabric that connects the resources is constrained. In other words, flexibility of the I/O fabric for connecting the resources configuring the computer is declined.

Therefore, an object of the present invention has been originated in view of the problem, and the object is to provide a system, an apparatus, a method, and a program that is capable of connecting resources configuring a computer without declining flexibility of an I/O fabric or the like.

Solution to Problem

According to one aspect of the present invention, a switching apparatus within a fabric is provided. That is, the switching apparatus within a fabric includes an analysis unit that is configured to extract a header of a received packet and to acquire information of the header; a determination unit that is configured to determine an operation for the packet according to information of a type, request source, and destination of a request included in the header; and an execution unit including a means configured to execute, in accordance with the determined operation, at least one of responding to the request included in the packet, rewriting the packet, and transmitting the packet.

According to the present invention, a computer system including the switching apparatus within an I/O fabric is provided.

According to another aspect of the present invention, a computer configuration method is provided. That is, the computer configuration method includes, by a switch within a fabric, extracting, when receiving a packet forwarded within the fabric, a header of the packet and acquires information of the header, determining an operation for the packet according to information of a type, request source, and destination of a request included in the header, and executing, in accordance with the determined operation, at least one of responding to the request included in the packet, rewriting the packet, and forwarding the packet.

According to the present invention, a program for the computer configuring a switch within the fabric is provided. That is, the computer program causes the computer configuring the switch to execute analysis processing for extracting a header of a received packet and acquiring information of the header; determination processing for determining an operation for the packet according to information of a type, request source, and destination of a request included in the header; and processing for executing, in accordance with the determined operation, at least one of responding to the request included in the packet, rewriting the packet, and forwarding the packet.

According to the present invention, a storage medium (semiconductor memory, magnetic disk/optical disk and the like) storing above described program is provided.

Advantageous Effects of Invention

According to the present invention, resources configuring a computer can be connected without declining flexibility of an I/O fabric or the like.

BRIEF DESCRIPTION OF DRAWINGS

FIG. 7 is a diagram illustrating a table included in an action determination unit.

DESCRIPTION OF EMBODIMENTS

Figure 14:
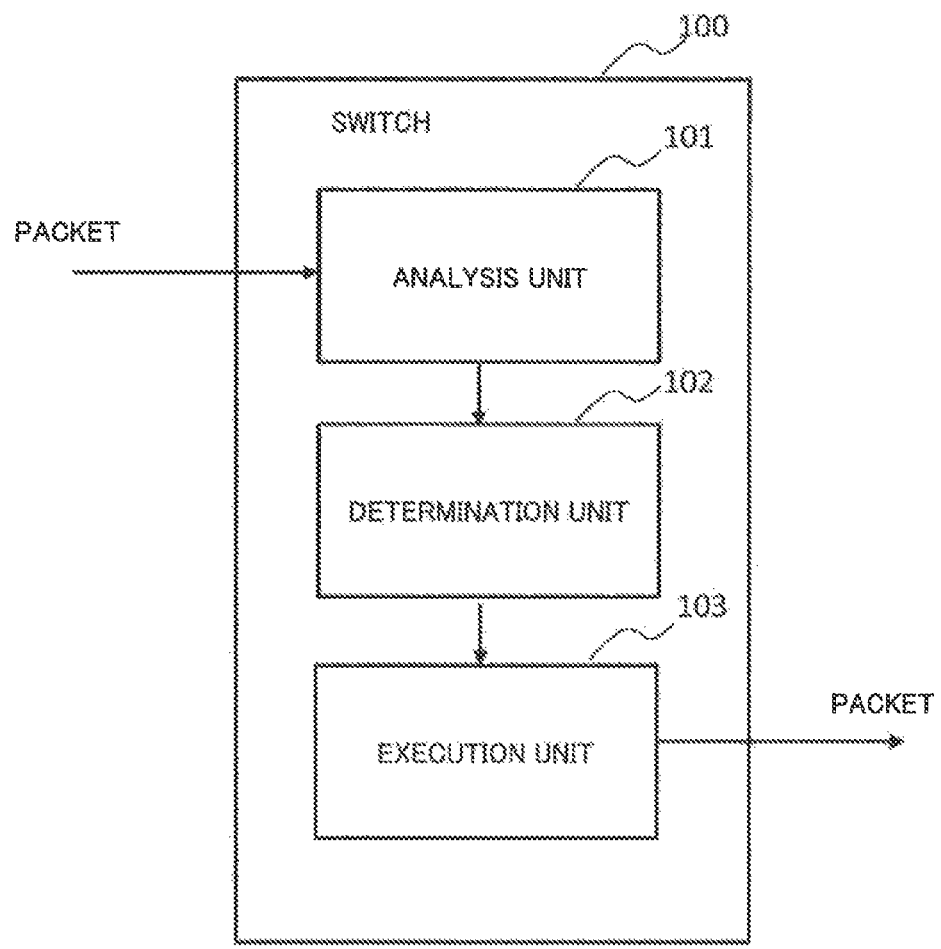
FIG. 14 is a diagram illustrating a basic concept of the present invention.

In the following, first, a basic concept of modes of the present invention will be described, and subsequently, an exemplary embodiment will be described. In one mode of the present invention, referring to FIG. 14, a switching apparatus (switch node) 100 within a fabric includes an analysis unit 101 that extracts, when receiving a packet transmitted within the fabric, a header of the packet and acquires information of the header. The switching apparatus 100 includes a determination unit 102 that determines an operation for the packet according to information of a type, request source, and destination of a request included in the header. The switching apparatus 100 includes an execution unit 103 including a means configured to execute, in accordance with the operation determined by the determination unit 102, at least one of responding to the request included in the packet, rewriting the packet, or transmitting the packet. A switching apparatus within a fabric is communicably connected to a plurality of nodes (e.g. root complexes and I/O devices) configuring the fabric.

Figure 4:
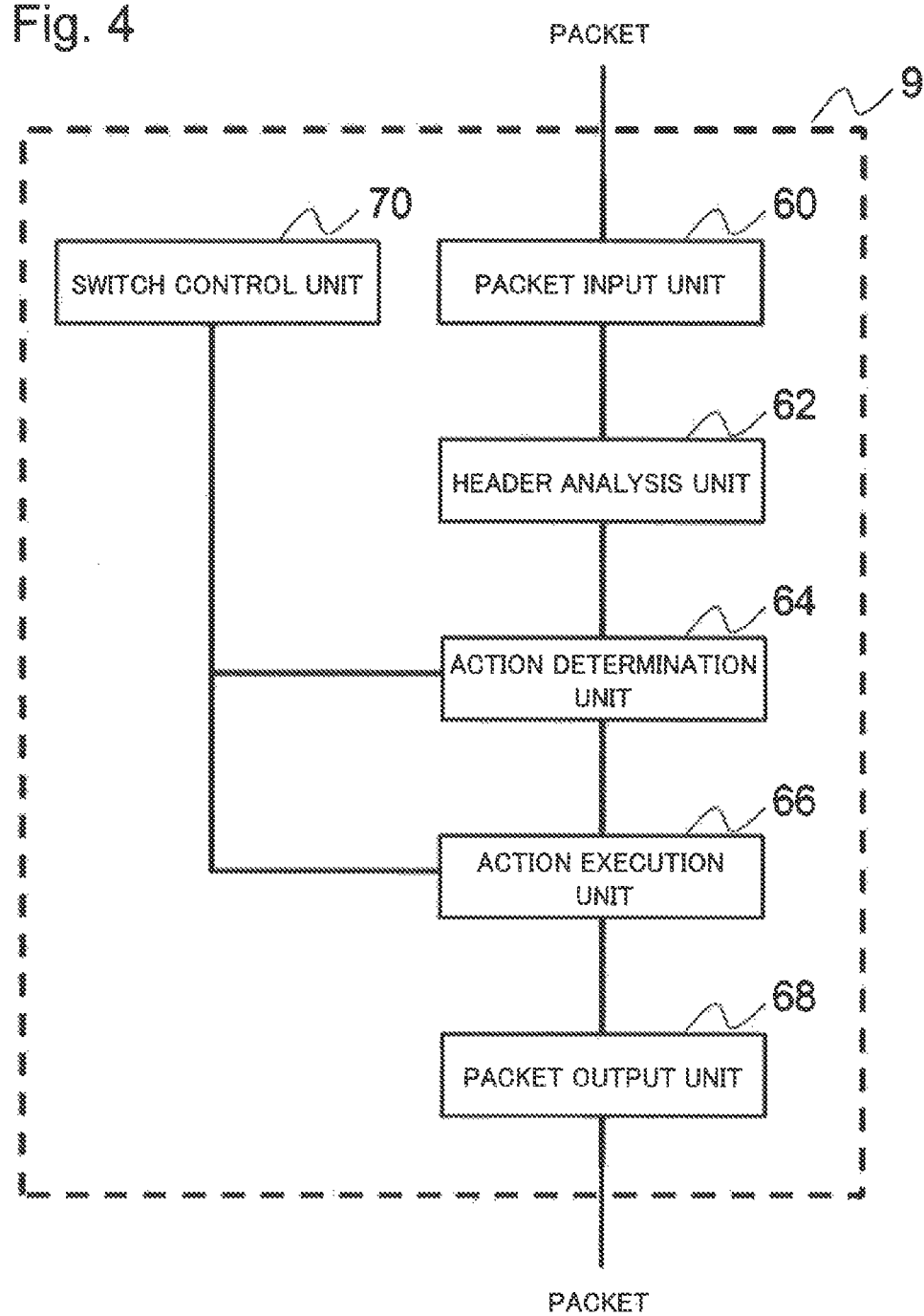
FIG. 4 is a diagram exemplifying a configuration of a switch of FIG. 2.

According to one of several modes, the switching apparatus may include:

a means (e.g. a header analysis unit 62 of FIG. 4) configured to extract a packet header for an input packet;

a means (e.g. an action determination unit 64 of FIG. 4) configured to determine an operation for the packet from the extracted packet header;

a means (an action execution unit 66 of FIG. 4) configured to execute, in accordance with the determined operation, at least one of responding (e.g. an I/O device emulation unit 664 of FIG. 8) to the request included in the packet, rewriting (e.g. a packet rewrite unit 668 of FIG. 8 and an inter-CPU bridge emulation unit 666 of FIG. 8) the packet, or transmitting (e.g. a PCI bridge emulation unit 662 of FIG. 8 and the inter-CPU bridge emulation unit 666 of FIG. 8) the packet;

a means (e.g. a packet output unit 68 of FIG. 4) configured to output the packet; and a control means (e.g. a switch control unit 70 of FIG. 4).

According to one of the several modes, the control means (the switch control unit 70 of FIG. 4) may include, for the means (e.g. the action determination unit 64 of FIG. 4) configured to determine an operation for the packet, a means configured to register an identifier of the packet and an identifier indicating an operation executed for the packet.

According to one of the several modes, the control means (the switch control unit 70 of FIG. 4) may include, for the means (the I/O device emulation unit 664 of FIG. 8) configured to respond to a request included in the packet, a means configured to set a configuration of a virtual I/O device.

According to one of the several modes, the control means (the switch control unit 70 of FIG. 4) may include, for the means (e.g. the packet rewrite unit 668 of FIG. 8 and the inter-CPU bridge emulation unit 666 of FIG. 8) configured to rewrite the packet, a means configured to set an identifier of the packet, an area where the packet is rewritten, and data after rewrite.

According to one of the several modes, the control means (the switch control unit 70 of FIG. 4) may include, a means configured to set an identifier of the packet and an identifier of a transmission destination of the packet for the means (e.g. the PCI bridge emulation unit 662 of FIG. 8 and the inter-CPU bridge emulation unit 666 of FIG. 8) configured to forward the packet.

According to the modes of the present invention, it is possible to set, for a switch included in an I/O fabric, how communication among nodes configuring the I/O fabric is performed. As a result, a configuration of an I/O fabric included in a computer system can be flexibly changed.

One exemplary embodiment of the present invention will be described with reference to the accompanying drawings. Numbers and reference signs of the drawings referred in this summary are placed for components as one example to assist understanding, and are not intended to limit the present invention to illustrated aspects.

[First Exemplary Embodiment]

Figure 1:
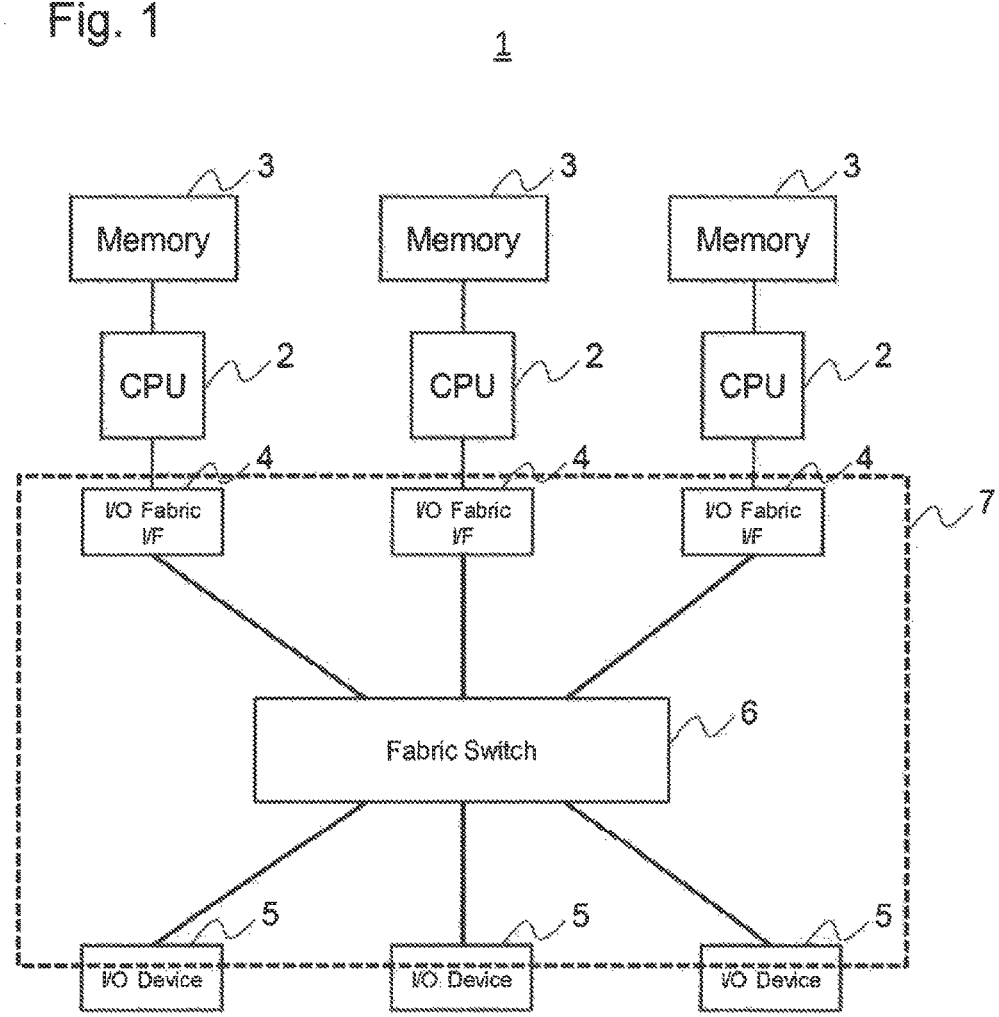
FIG. 1 is a diagram exemplifying a configuration of one example embodiment of the present invention.

FIG. 1 is a diagram exemplifying a configuration of a computer system 1 according to a first exemplary embodiment of the present invention. Referring to FIG. 1, the computer system 1 includes a CPU (Central Processing Unit) 2, a memory 3, an I/O fabric I/F (Interface) 4, an I/O device 5, and a fabric switch 6. The CPU 2 is connected to the I/O device 5 via the I/O fabric I/F 4 and the fabric switch 6. As examples of the I/O device 5, an NIC (Network Interface Card), a GPU (Graphics Processing Unit), and a storage controller may be included. The I/O device 5 includes an I/O fabric I/F that is not illustrated in FIG. 1. The fabric switch 6, the I/O fabric I/F 4, the I/O fabric I/F (not illustrated) included in the I/O device 5 and a link connecting these together constitutes the I/O fabric 7. The I/O fabric 7 operates in accordance with, for example, a protocol of PCI-Express (registered trademark).

Figure 2:
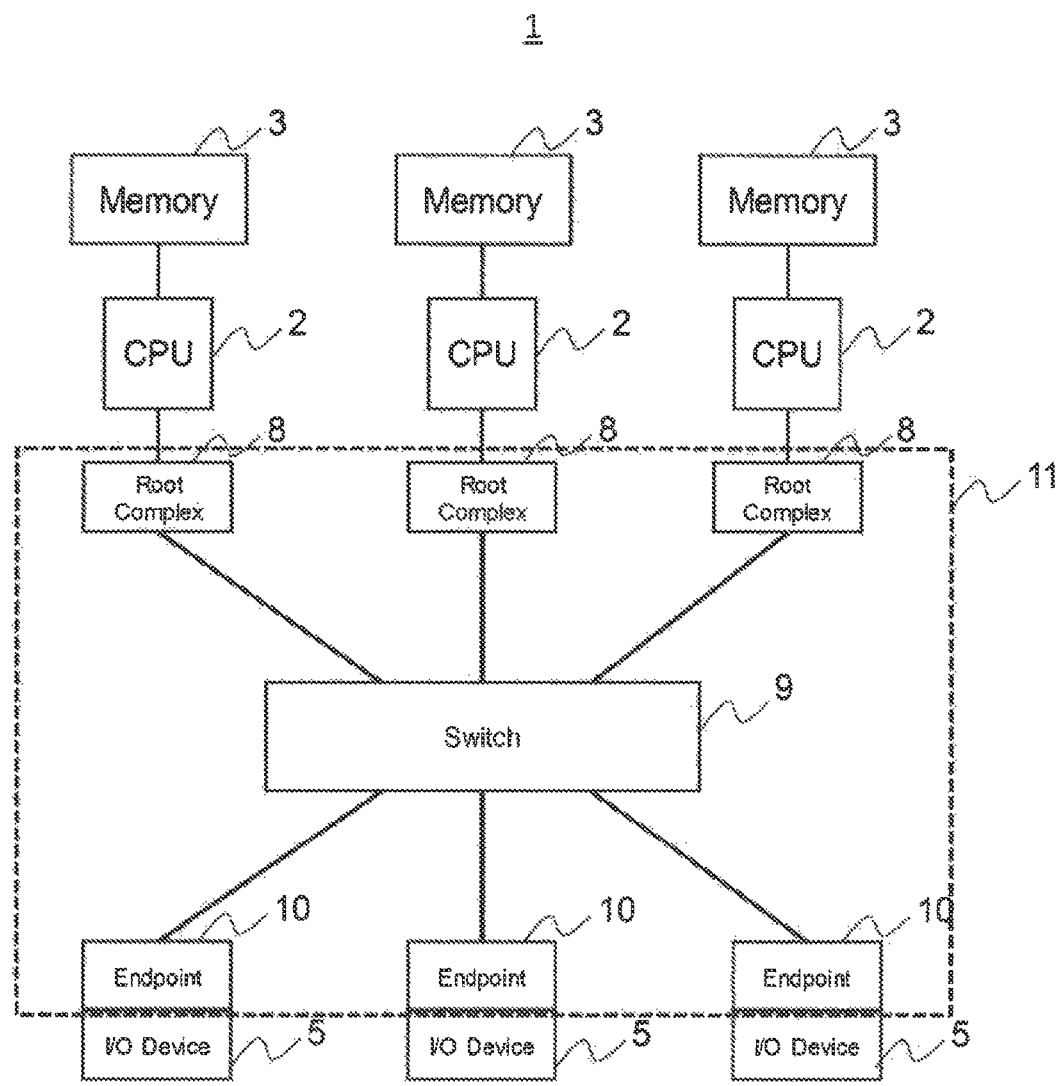
FIG. 2 is a diagram exemplifying a configuration in which the I/O fabric of FIG. 1 operates in accordance with a protocol of PCI-Express (registered trademark).

FIG. 2 is a diagram illustrating a configuration of a PCI-Express (registered trademark) fabric 11 in which the I/O fabric 7 operates in accordance with a protocol of PCI-Express (registered trademark) in FIG. 1. In this case, the I/O fabric I/F 4 of FIG. 1 is equivalent to a root complex 8 of FIG. 2. The I/O fabric I/F (not illustrated) included in the I/O device 5 of FIG. 1 is equivalent to an endpoint 10 of FIG. 2. The fabric switch 6 of FIG. 1 is equivalent to a switch 9 of FIG. 2. The switch 9 of FIG. 2 includes a plurality of PCI-PCI bridges that are not illustrated. Hereinafter, the I/O fabric 7 will be described on the basis of the PCI-Express (registered trademark) fabric 11 as an example, but the present invention is not limited to a computer system including PCI-Express (registered trademark).

Figure 3:
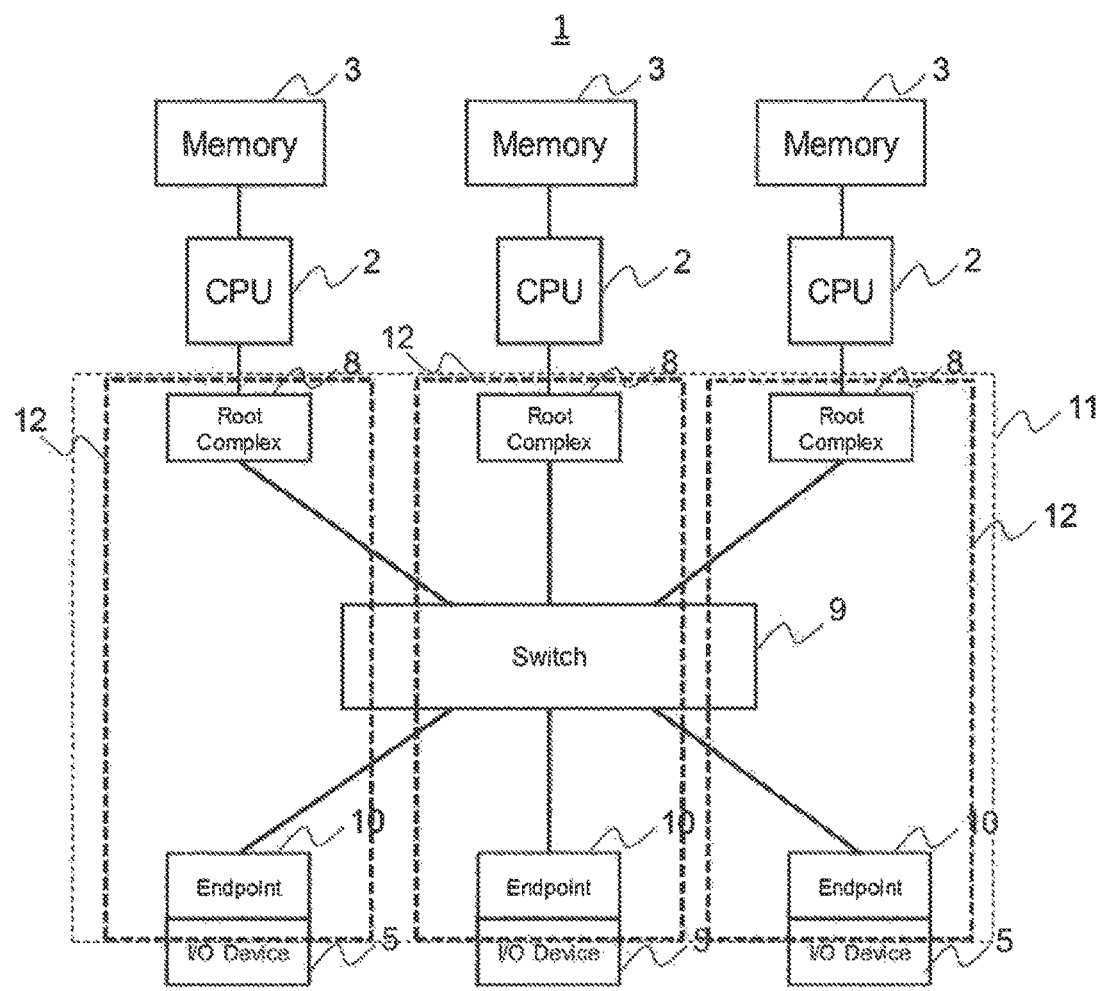
FIG. 3 is a diagram exemplifying a device tree.

In FIG. 2, a CPU 2 and an I/O device 5 transmit/receive data or control information via the PCI-Express (registered trademark) fabric 11. In the case of PCI-Express (registered trademark), a device tree is configured in which a plurality of endpoints 10 are connected in a tree-shaped manner for one root complex 8, via the switch 9. In other words, there is only one root complex 8 within the same device tree. Therefore, in the computer system 1 of FIG. 2, there are three device trees 12 in which each root complex 8 is a root as in FIG. 3. FIG. 3 is a diagram illustrating an example of the device tree 12. In FIG. 3, each I/O device 5 is exclusively allocated to each device tree 12. However, when the I/O device 5 is compatible to MR-IOV (Multi Root I/O Virtualization), a single I/O device 5 may be connected to a plurality of root complexes 8.

FIG. 4 is a diagram exemplifying a configuration of the switch 9 of FIG. 2. Referring to FIG. 4, the switch 9 includes a packet input unit 60, a header analysis unit 62, an action determination unit 64, an action execution unit 66, a packet output unit 68, and a switch control unit 70. The respective units will be described below.

The packet input unit 60 receives an input of a PCI-Express (registered trademark) packet (hereinafter, expressed as a "packet") from the outside of the switch 9. In the case of PCI-Express (registered trademark), in a physical layer, a packet is encoded using an encoding system such as "8b/10b" encoding, "128b/130b" encoding, or the like. Therefore, when a physical layer of the PCI-Express (registered trademark) fabric 11 conforms to a protocol of PCI-Express (registered trademark), the packet input unit 60 decodes the packet. On the other hand, when the physical layer of the PCI-Express (registered trademark) fabric is not PCI-Express (registered trademark), or, for example, Ethernet (registered trademark) is used to connect a computer and an I/O device enclosure box, the physical layer is Ethernet (registered trademark). In this case, a packet is not encoded, and therefore it is unnecessary to decode the packet.

A packet input from the packet input unit 60 is supplied to the header analysis unit 62. The header analysis unit 62 extracts a header area of the packet and acquires a type of the packet and destination information of the packet.

In PCI-Express (registered trademark), a transaction layer (the uppermost layer of PCI-Express (registered trademark), and an upper layer of a data link layer) includes a type and destination of a packet. The transaction layer generates a transaction layer packet (TLP) in accordance with a request from a software layer, supplies the generated packet to the data link layer, analyzes data received from the data link layer, and supplies the analyzed data to the software layer. The TLP includes two types of packets, one type is a request and another type is completion indicating a termination of processing, with regard to processing for a memory and each read/write processing of an I/O. A header of the request TLP includes a requester ID indicating a device of a request source and a tag unique to the request. The completion that is a completion notification of processing includes a completer ID indicating a device having executed processing, a requester ID indicating source of the request, and a tag of the completed request.

Figure 5:
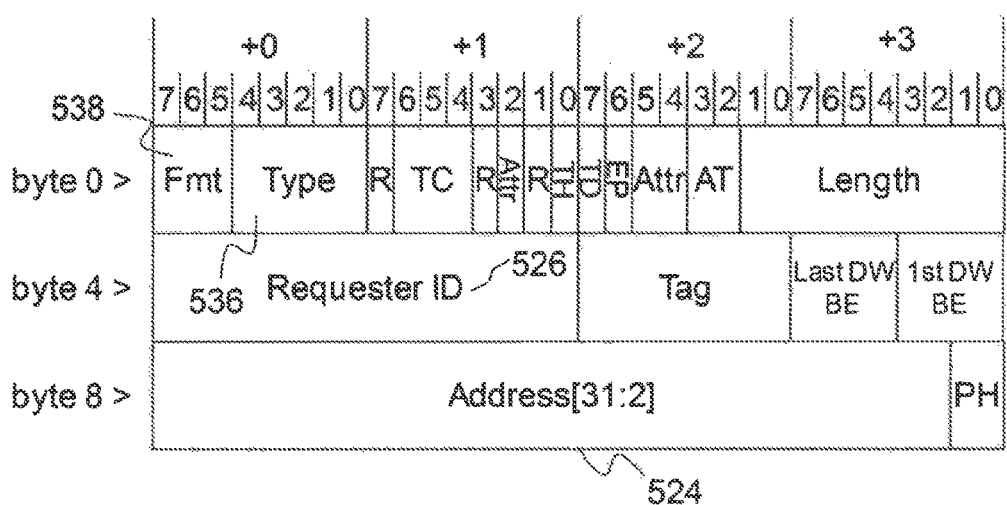
FIG. 5 is a diagram illustrating one example of a format of a TLP header.

FIG. 5 is a diagram illustrating an example which represents destination information of a packet by a memory address, in a format of a TLP header in a PCI-Express (registered trademark) protocol. Referring to FIG. 5, a transmission source of a packet is specified by a requester ID 526. A destination of the packet is specified by a memory address (address [31:2], 2 bits to 31 bits) 524. In this manner, a destination of a packet is specified by a memory address, when a request transmitted between the root complex 8 and the endpoint 10 (FIG. 2) is a memory request or an I/O request.

A type of the request is represented by a combination of a format (FMT) 538 and a type 536.

As the requester ID 526, a combination (BDF number) of {a bus number, a device number, and a function number} of a device tree or an ARI (Alternative Routing ID) is used. Hereinafter, as an example, a BDF number is used as the requester ID 526, but this does not limit the present invention to the use of a BDF number as a requester ID.

Figure 6:
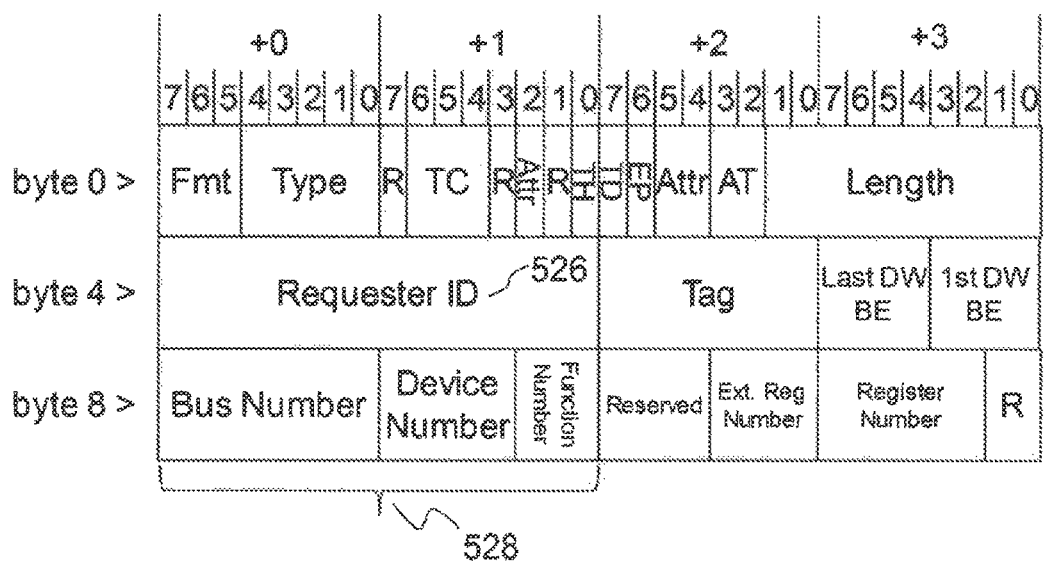
FIG. 6 is a diagram illustrating an example in which destination information of a packet of a format of a TLP header is represented by a BDF number.

FIG. 6 is a diagram illustrating an example in which destination information of a packet is represented by a BDF number in a format of a TLP header in the PCI-Express (registered trademark) protocol. Referring to FIG. 6, a transmission source of a packet is represented by a requester ID 526. A destination of the packet is represented by a BDF number 528. A destination of a packet is represented by a BDF number when a request exchanged between the root complex 8 and the endpoint 10 is any one of a configuration request,
a message request, and
a completion notification.

Referring to FIG. 4 again, information of a packet header (e.g. a TLP header of FIG. 5 or FIG. 6) extracted by the header analysis unit 62 in the switch 9 is supplied to the action determination unit 64, together with a payload part of the packet.

The action determination unit 64 determines what type of processing is executed for the packet, on the basis of the information of the packet header supplied from the header analysis unit 62. Without specific limitation, the action determination unit 64 determines processing for the packet on the basis of the information of the packet header using, for example, a table as illustrated in FIG. 7. FIG. 7 is a diagram illustrating an example of a table included in the action determination unit 64.

Referring to FIG. 7, the FIG. 7 represents configuration that an action ID is determined by a request type, a requester ID, and destination information (destination (memory range or BDF#)). Information held in a field of the destination information based on the request type is a memory address or a BDF number. Examples of the action include
specifying an output port in a switch,
changing a header area of a packet, and
changing a payload part of the packet.
For these actions, unique action IDs are assigned, respectively.

Referring to FIG. 4 again, the action determination unit 64 supplies, after determining an action, an action ID of the determined action, information of a packet header, and a payload part of the packet to the action execution unit 66.

Figure 8:
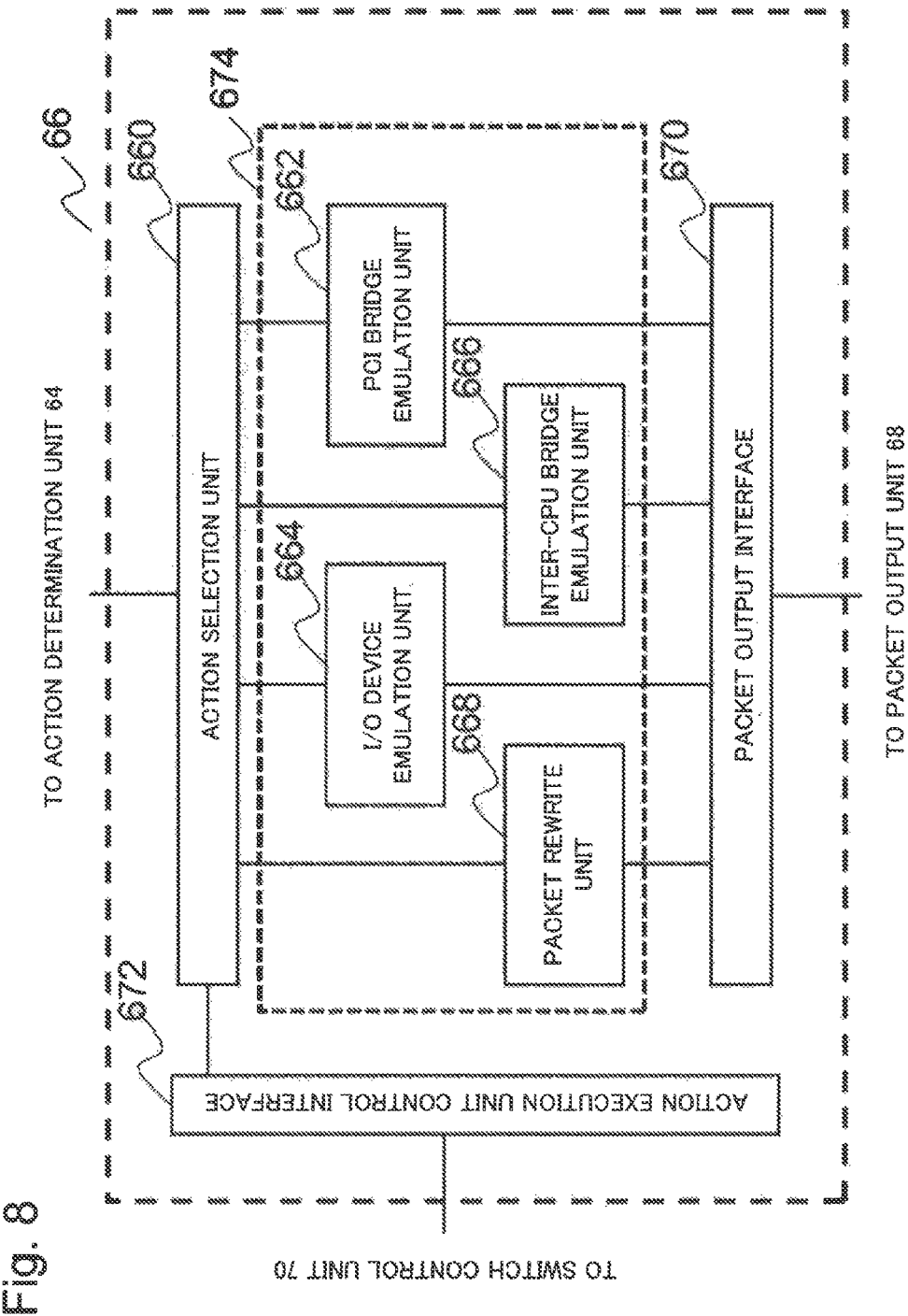
FIG. 8 is a diagram exemplifying a configuration of an action execution unit.

FIG. 8 is a diagram exemplifying a configuration of the action execution unit 66 of FIG. 4. Referring to FIG. 8, the action execution unit 66 includes an action selection unit 660, a packet output interface 670, an action execution unit control interface 672, and an action execution processing unit 674. However, the action execution unit 66 is not limited to the above-described configuration. The respective units are described below.

The action execution processing unit 674 includes a plurality of processing blocks in accordance with a type of processing (action) for a packet. In an example illustrated in FIG. 8, the action execution processing unit 674 includes a PCI bridge emulation unit 662, an I/O device emulation unit 664, an inter-CPU bridge emulation unit 666, and a packet rewrite unit 668. However, the action execution processing unit 674 is not limited to the above-described configuration.

Referring to FIG. 8, the action selection unit 660 supplies, on the basis of an action ID of an action supplied from the action determination unit 64 of FIG. 4, information of a packet header (e.g. a TLP header of FIG. 6) and a payload part of the packet to the processing units which is included in the action execution processing unit 674.

The action execution unit control interface 672 is an interface for setting and controlling the action execution unit 66. The switch control unit 70 of FIG. 4 executes various types of settings for the action execution unit 66 via the action execution unit control interface 672. Examples of the settings will be described later. The switch control unit 70 may be realized so as to be accessible from, for example, a switch management server or the computer system 1. This is realized by implementing configuration similar to a management port of Ethernet (registered trademark) switch, a router, or the like.

The processing units included in the action execution processing unit 674 have unique identifiers corresponding to identifiers specified by the action determination unit 64 of FIG. 4, respectively, on a one-to-one basis. With reference to FIG. 8, the processing units of the action execution processing unit 674 will be described below.

The PCI bridge emulation unit 662 realizes data transmission between the root complex 8 and the I/O device 5 (FIG. 2 or FIG. 3) or between the I/O devices 5 (FIG. 2 or FIG. 3). The PCI bridge emulation unit 662 includes a forwarding table (82 of FIG. 13) for outputting a packet transmitted by the root complex 8 or the I/O device 5 of FIG. 2 or FIG. 3 to an appropriate port of the switch 9. The forwarding table (82 of FIG. 13) may be, for example, configured as in FIG. 7 being referred to in the description of the action determination unit 64.

However, in the forwarding table included in the PCI bridge emulation unit 662, a field (column) indicating an action ID of FIG. 7 stores information indicating an output destination of a packet. Further, as the information indicating an output destination of a packet, an identifier of a processing unit included in the action execution processing unit 674 is also used, in addition to an identifier of a port of the switch 9 of FIG. 2, in order to respond to a case in which processing for the packet such as rewriting the packet is necessary. Further, when the packet is output to another processing unit, the PCI bridge emulation unit 662 outputs the packet and an identifier of the another processing unit to the action selection unit 660. The action selection unit 660 receives the identifier of the processing unit output from the PCI bridge emulation unit 662, and forwards the packet to an appropriate processing unit, by referring to the identifier of the processing unit.

Each I/O device 5 (each endpoint 10) of FIG. 3 or the like is assigned with a unique BDF number (a bus number, a device number, and a function number) within the device tree 12. In a header (see FIG. 6) of a packet transmitted by the I/O device 5, a BDF number 528 (see FIG. 6) of the I/O device 5 is stored as a requester ID.

The PCI bridge emulation unit 662 of FIG. 8 determines whether to forward a packet to another I/O device 5, by use of
- a requester ID included in a packet header, and
- a BDF number (see FIG. 6) of a destination I/O device 5 that is destination information of the packet or a memory address (see FIG. 5) for specifying the destination I/O device 5.

Figure 9:
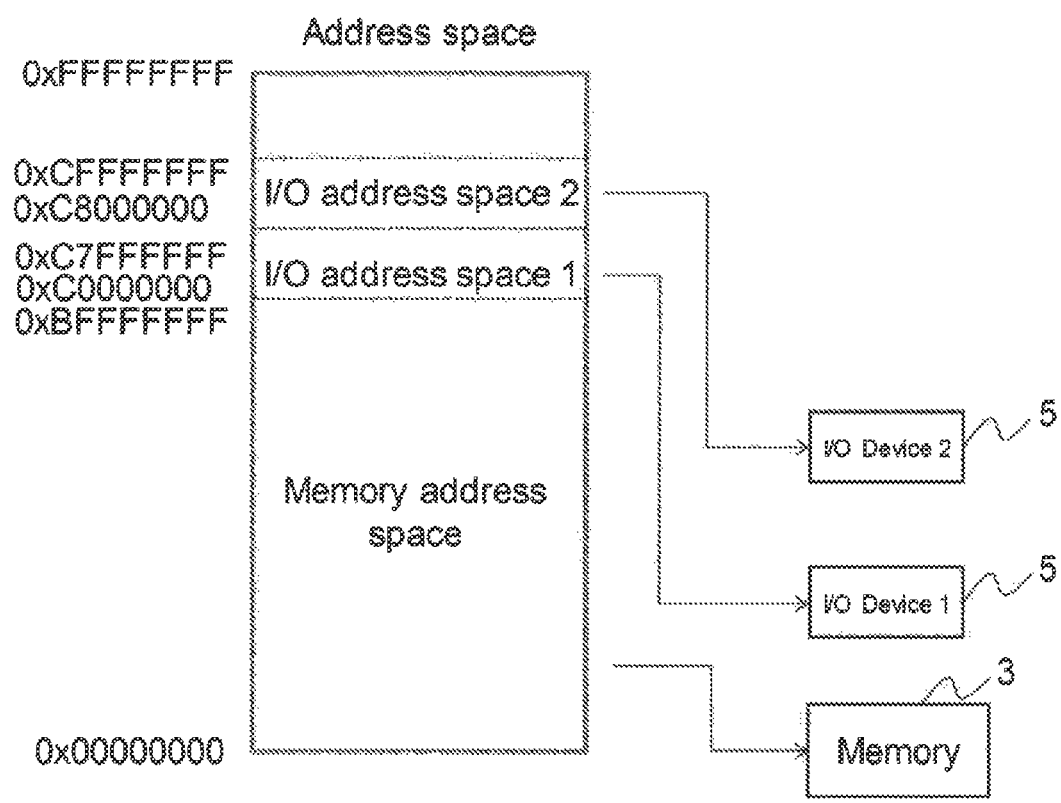
FIG. 9 is a diagram illustrating a memory address space.

In general, in a computer system, the memory 3 and each I/O device 5 are allocated with a specific area of a memory address space defined by the computer system. FIG. 9 is a diagram schematically illustrating an example of the memory address space. In FIG. 9, a memory address space of 32 bits is illustrated, and a memory address range is 0x00000000 to 0xFFFFFFFF ("0x" is a symbol indicating a hexadecimal number).

In this memory address space,
- a range of 0x00000000 to 0xBFFFFFFF is allocated as a memory address space for the memory 3 (FIG. 2 or FIG. 3), and
- a range of 0xC0000000 to 0xCFFFFFFF is allocated as an I/O address space for the I/O device 5 (FIG. 2 or FIG. 3).

In the example illustrated in FIG. 9, a part (0xC0000000 to 0xC7FFFFFF) of the I/O address space for the I/O devices is allocated to a first I/O device (I/O device 1) 5, and another area (0xC8000000 to 0xCFFFFFFF) of the I/O address space for the I/O devices is allocated to a second I/O device (I/O device 2) 5.

In FIG. 2 or FIG. 3, the switch 9 has information on allocation of the memory exemplified in FIG. 9 and manages a range of a memory address corresponding to each port of the switch 9. By this, the switch 9 is able to output a packet to an appropriate port, on the basis of a memory address included in a packet header.

In FIG. 2 or FIG. 3, each I/O device 5 determines, to which one of the memory addresses, a read request or a write request is issued, on the basis of a notification from an Operating System (OS) or driver software operating on the CPU 2.

Figure 10:
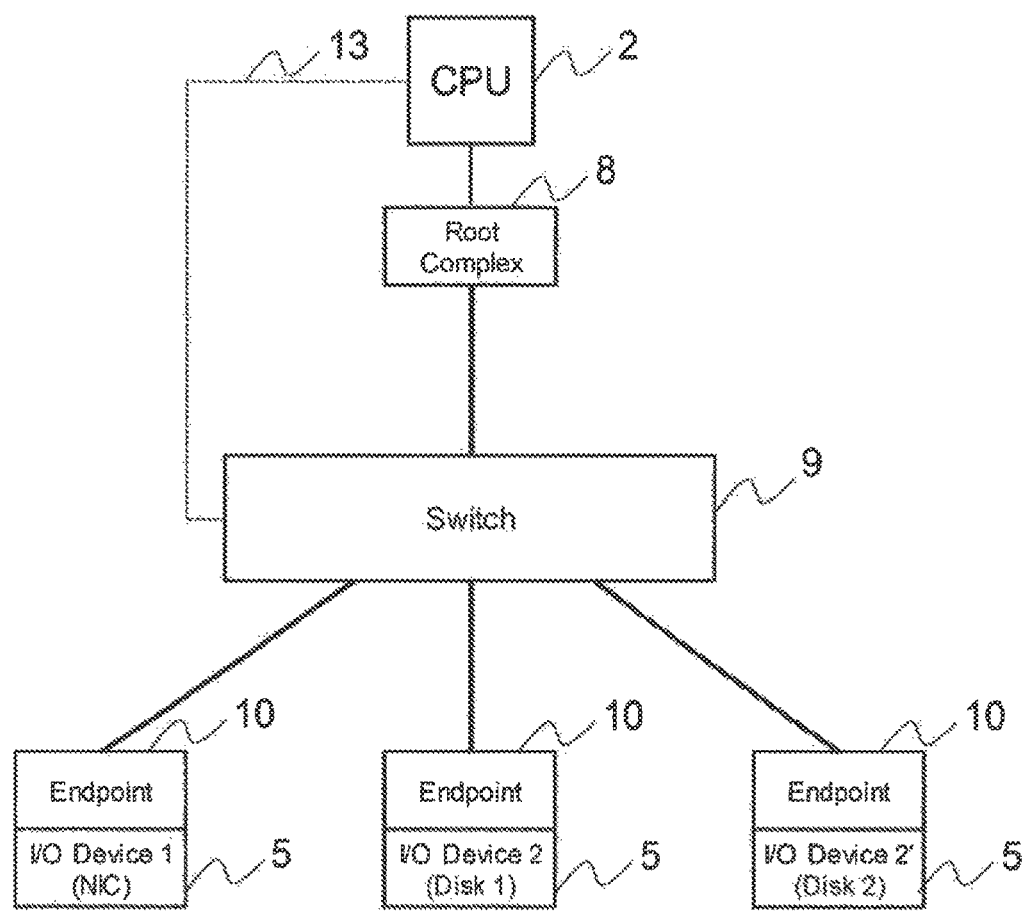
FIG. 10 is a diagram exemplifying a device tree.

In the following, a case in which three I/O devices 5 are connected to one device tree via the switch 9 as illustrated in FIG. 10, will be described as an example. FIG. 10 is a diagram exemplifying a device tree for illustrating an operation of the I/O device emulation unit 664.

Referring to FIG. 10, it is assumed that the respective I/O devices 5 are an NIC (I/O device 1), a disk 1 (I/O device 2), and a disk 2 (I/O device 2'). Further, The CPU 2 and the switch 9 are connected through a management link 13. The management link 13 is connected to the switch control unit 70 (see FIG. 4) inside the switch 9.

The NIC transmits a packet of PCI-Express (registered trademark) to a memory address indicating the disk 1 in order to write an Ethernet (registered trademark) packet received from an external network on the disk 1.

When an OS or the like executed on the CPU 2 detects that a remaining capacity of the disk 1 has become small, the CPU 2 issues, to the switch 9, an instruction that "a packet of a write request for the disk 1 is transmitted to the disk 2, among packets of PCI-Express (registered trademark) from the NIC" through the management link 13.

This instruction is specifically described as follows.

(1) An instruction for adding following entries of a PCI-Express (registered trademark) packet,
{request type=memory write,
requester ID=a BDF number of the NIC,
destination=a memory address indicating the disk 1, and
action=an ID indicating the packet rewrite unit 668}
to a forwarding table of the PCI bridge emulation unit 662 of FIG. 8, and (2) an instruction for adding an entry that
"a destination address of a packet is rewritten in an area indicated in the disk 2 and the rewritten destination address is output to a port of the switch 9 connected to the disk 2" to an action table included in the packet rewrite unit 668 (a configuration thereof will be described later) of FIG. 8.

Through the above-described instruction, in FIG. 10, the following Ethernet (registered trademark) packet received by the NIC is forwarded to the disk 2 without a setting change for the NIC.

Referring to FIG. 8 again, the I/O device emulation unit 664 executes an emulation for providing a virtual I/O device for the root complex 8. A configuration of the virtual I/O device (a vendor ID of a device, a type of the device, a function of the device, a size of a necessary address space, and the like) is set on the basis of an instruction from the switch control unit 70 of FIG. 4. These pieces of configuration information are held on the I/O device emulation unit 664 together with addresses indicating registers in accordance with specifications of a register map of PCI-Express (registered trademark).

Figure 11:
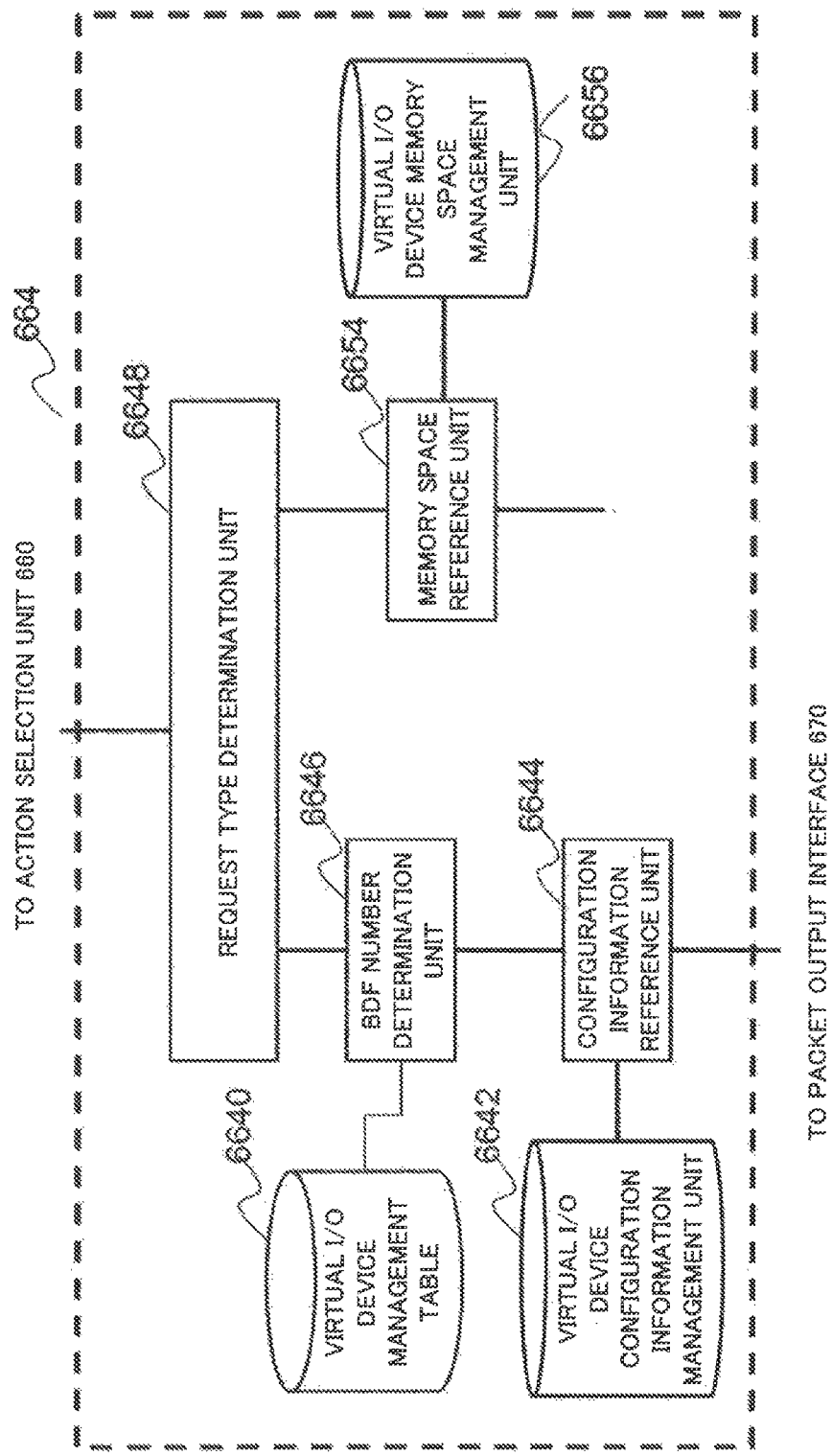
FIG. 11 is a diagram exemplifying a configuration of an I/O device emulation unit.

FIG. 11 is a diagram exemplifying a configuration of the I/O device emulation unit 664 of FIG. 8. Referring to FIG. 11, the I/O device emulation unit 664 includes a virtual I/O device management table 6640, a virtual I/O device configuration information management unit (table) 6642, a configuration information reference unit 6644, a BDF number determination unit 6646, a request type determination unit 6648, a memory space reference unit 6654, and a virtual I/O device memory space management unit 6656. However, t the I/O device emulation unit 664 is not limited to the above-described configuration.

One I/O device emulation unit 664 is included in the action execution processing unit 674 of FIG. 8 for each device tree. Each I/O device emulation unit 664 can include, in the interior thereof, a plurality of virtual I/O devices. This makes it possible for the I/O device emulation unit 664 to provide a plurality of virtual I/O devices for one device tree. Each of the virtual I/O devices has a unique BDF number within the computer system 1 (FIG. 2 or FIG. 3). Specifically, a bus number different from bus numbers assigned to respective links of the switch 9 is used.

The action determination unit 64 of FIG. 4 transmits, when destination information of a packet from the root complex 8 (FIG. 2 or FIG. 3) is a BDF number corresponding to a virtual I/O device or a memory address corresponding to the virtual I/O device, the packet (request) to the I/O device emulation unit 664. However, in the computer system 1, a BIOS (Basic Input/Output System) initializes I/O devices including a virtual I/O device at start-up of the system, and after the initialization of the I/O devices, a memory address corresponding to each I/O device is determined. Therefore, an entry corresponding to for the virtual I/O device is added to a forwarding table included in the action determination unit 64, after initialization of the virtual I/O device. Initialization of the I/O device including the virtual I/O device is executed by a configuration request.

First, referring to FIG. 8, a case, in which the I/O device emulation unit 664 has received a configuration request from the action determination unit 64, will be described.

In the case of the configuration request, the request is expressed by the packet format illustrated in FIG. 6. As illustrated in FIG. 6, using 4 bytes from 8 bytes to 11 bytes of FIG. 6, a BDF number and a register number are specified.

For an I/O specified by the BDF number and a register specified by the register number, reading and writing are executed. In the case of a configuration write request, further, data to be written is specified using 4 bytes (not illustrated in FIG. 6) from a 12th byte.

In FIG. 11, the request type determination unit 6648 determines whether the destination information is a BDF number or a memory address, on the basis of a request type included in a packet supplied from the action determination unit 64 of FIG. 4 through the action selection unit 660 of FIG. 8. The request type determination unit 6648 supplies a request to the BDF number determination unit 6646 when the destination information is a BDF number. The BDF number determination unit 6646 accesses the virtual I/O device management table 6640 using the BDF number of the configuration request transmitted from the request type determination unit 6648.

Figure 12:
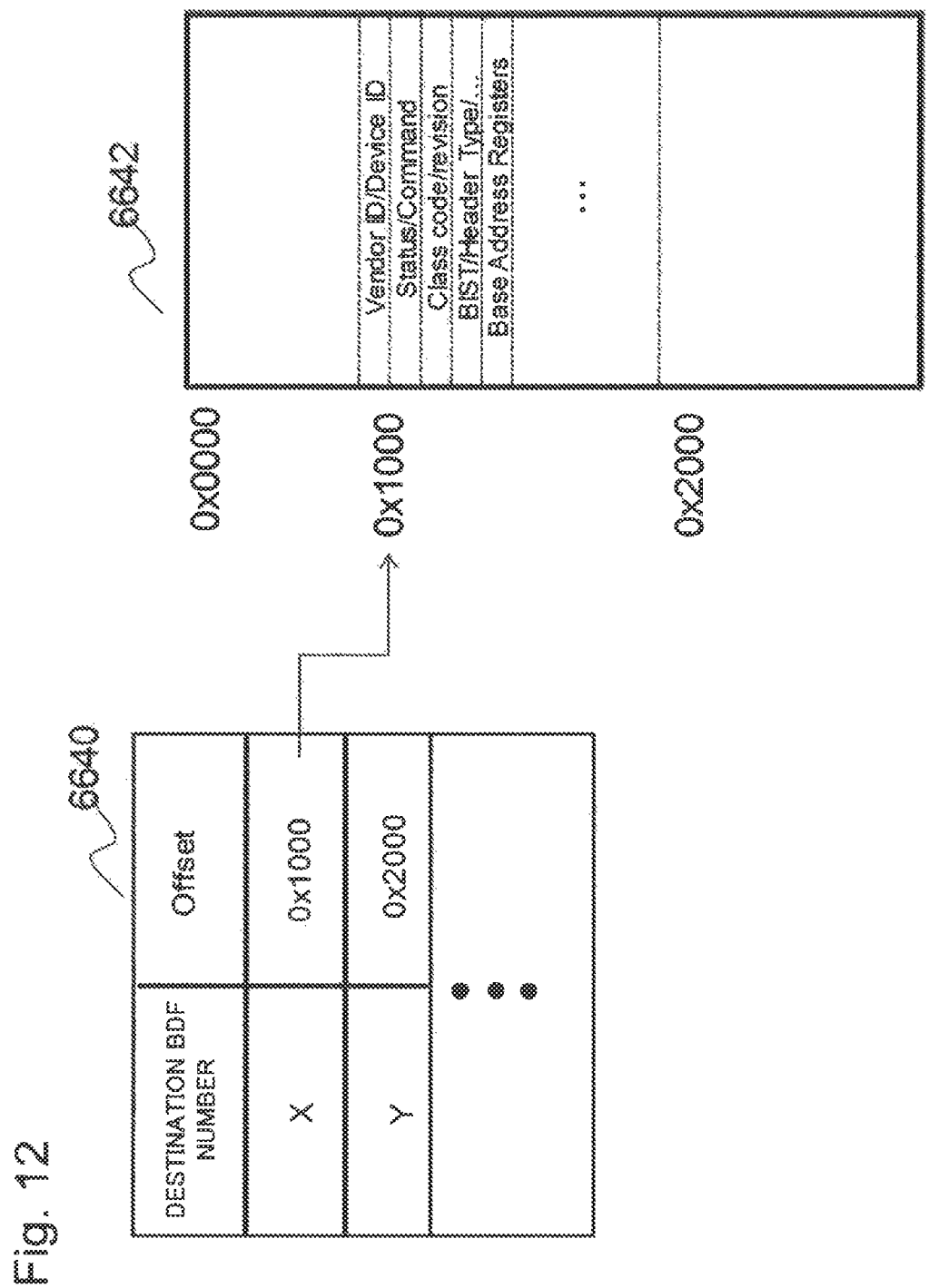
FIG. 12 is a diagram exemplifying a configuration of a virtual I/O device management table and a configuration of a virtual I/O device configuration information management unit.

FIG. 12 is a diagram exemplifying a configuration of the virtual I/O device management table 6640 and a configuration of the virtual I/O device configuration information management unit 6642 of FIG. 11. Referring to FIG. 12, the virtual I/O device management table 6640 is configured to obtain an offset value (e.g. an offset from a top address 0x0000) of the virtual I/O device configuration information management unit 6642 using an input destination BDF number as a key.

In FIG. 11, after obtaining an offset value from the virtual I/O device management table 6640, the BDF number determination unit 6646 supplies the offset value and the configuration request to the configuration information reference unit 6644.

The configuration information reference unit 6644 supplies a result obtained by adding a register number included in the configuration request and the offset value, and an identifier indicating a type (read or write) of the configuration request, to the virtual I/O device configuration information management unit 6642.

The virtual I/O device configuration information management unit 6642 stores, by regarding the input value as an address, data on a data storing area corresponding to the address or reads data from the data storing area, as illustrated in FIG. 12. In the present example embodiment, the virtual I/O device configuration information management unit 6642 regards sum of an offset value and a register number supplied from the configuration information reference unit 6644 as an address. The virtual I/O device configuration information management unit 6642, in accordance with a type of a configuration request, reads data from a data storing area corresponding to the address (configuration read request) or writes data in a data storing area corresponding to the address (configuration write request).

In PCI-Express (registered trademark), the configuration request is a non-posted transaction, and therefore the configuration information reference unit 6644 generates a completion packet and transmits the generated packet to a device having a requester ID.

In the case of a configuration read request, the configuration information reference unit 6644 incorporates data read from the virtual I/O device configuration information management unit 6642 into a completion packet and transmits the incorporated data to a device having a requester ID.

For a configuration request from the action determination unit 64, the I/O device emulation unit 664 exchanges a packet regarding such a configuration request between itself and the root complex 8. Thereby a virtual I/O device is initialized and a memory area is allocated. Information on the allocated memory area is transmitted to the action determination unit 64, for example, together with the BDF number of the virtual I/O device through the switch control unit 70 of FIG. 4.

In the action determination unit 64 of FIG. 4, an entry, for supplying a packet having a memory address included in the memory area as destination information to the I/O device emulation unit 664 of FIG. 8, is added.

Next, a case, in which the I/O device emulation unit 664 of FIG. 8 has received a memory read request or a memory write request from the action determination unit 64 of FIG. 4, will be described.

When a memory read request or a memory write request for a virtual I/O device reaches the switch 9, first, the action determination unit 64 of FIG. 4 determines an action on the basis of a requester ID, a request type, and destination information included in a packet. When the action is intended for a virtual I/O device, the packet and an action ID (see FIG. 7) are supplied to the action execution unit 66 of FIG. 4. Further, the action execution unit 66 supplies a request for the virtual I/O device to the I/O device emulation unit 664 of FIG. 11 on the basis of the action ID.

Referring to FIG. 11, in the I/O device emulation unit 664, the request type determination unit 6648 determines whether a request supplied from the action execution unit 66 of FIG. 4 is a memory read request or a memory write request, and supplies the request to the memory space reference unit 6654.

The memory space reference unit 6654 refers to the virtual I/O device memory space management unit 6656, by use of destination information (memory address) and a request type included in the request.

The virtual I/O device memory space management unit 6656 reads data or writes data for a corresponding area using an address value as an input.

The virtual I/O device memory space management unit 6656 reads or writes data for an area indicated by the input address value on the basis of the request type supplied from the memory space reference unit 6654.

In the case of data read, data being read from the virtual I/O device memory space management unit 6656 is supplied to the memory space reference unit 6654.

The memory space reference unit 6654 generates a completion packet on the basis of specifications of PCI-Express (registered trademark) and transmits the read data to a requester.

For example, an initialization sequence of a real I/O device may be used for generating setting information of a register map set for the virtual I/O device configuration information management unit 6642. A format of the register map is defined by specifications of an I/O fabric, and therefore by capturing following
an address of a register to be accessed and
data written in the register or data read from the register in the CPU 2 or the switch 9 of FIG. 2 or FIG. 3, it is possible to generate setting information of the register map.

For example, a packet received from the switch 9 is forwarded from the action execution unit 66 (FIG. 4) of the switch 9 to the switch control unit 70, and thereby a packet forwarded during an initialization sequence of a real IO device directly or indirectly connected to the switch 9 is captured. In PCI-Express (registered trademark), an order of registers accessed during initialization of an I/O device is previously determined. Upon an access to the registers, the I/O device emulation unit 664 starts a capture.

A rule is set for a table included in the action determination unit 64 so as to forward, for example, all configuration requests to the I/O device emulation unit 664 (FIG. 8) of the action execution unit 66.

In the I/O device emulation unit 664 (FIG. 8), among the forwarded configuration requests, a request for a register to be accessed first is extracted among registers to be accessed during initialization of an I/O device (5 of FIG. 2 or FIG. 3), and a capture is started.

When the capture is started, the I/O device emulation unit 664 allocates an area where configuration information is written, in the virtual I/O device configuration information management unit 6642 (FIG. 11).

The I/O device emulation unit 664 supplies the configuration request to the PCI bridge emulation unit 662 (FIG. 8), and thereby the configuration request is forwarded to an appropriate I/O device (to which the request needs to be forwarded originally).

A response to the configuration request from the I/O device (5 of FIG. 2 or FIG. 3) is supplied from the PCI bridge emulation unit 662 (FIG. 8) to the I/O device emulation unit 664. Therefore, the I/O device emulation unit 664 can capture the packet flowing during I/O device initialization.

The I/O device emulation unit 664 provides a virtual I/O device by use of generation information of a register map acquired in such a manner.

The inter-CPU bridge emulation unit 666 of FIG. 8 is a module that realizes exchanges of data or control information between different device trees. The inter-CPU bridge emulation unit 666 provides a virtual I/O device for each device tree. This virtual I/O device has a configuration similar to that of an NTB, for example.

The configuration of the virtual I/O device has already been described in association with the I/O device emulation unit 664, and therefore description thereof will be omitted.

One NTB is included in each device tree for each pair of the CPUs 2 that exchange data or control information. Therefore, when a virtual I/O device (NTB) to be accessed by the CPU 2 being a transmission source is selected, the CPU 2 being a transmission destination is uniquely determined.

In the NTB, communication between the CPUs 2 is realized by use of a memory read request or a memory write request. Therefore, each virtual I/O device (NTB) provided by the inter-CPU bridge emulation unit 666 receives a memory read request or a memory write request.

A virtual I/O device (NTB) having been accessed by the CPU 2 of the transmission source converts destination information (memory address) to a memory address assigned to the virtual I/O device (NTB) in a device tree of the transmission destination CPU 2. Further, transmission source information is rewritten to a BDF number of the virtual I/O device (NTB) in the device tree of the transmission destination CPU 2. In accordance with the rewritten destination information (memory address), the request is transmitted into the device tree of the transmission destination CPU 2.

In FIG. 8, the packet rewrite unit 668 rewrites a transmitted packet. A type of rewriting being performed is specified by the switch control unit 70 of FIG. 4 via the action execution unit control interface 672. The specified information includes at least
information of a packet to be rewritten,
an area where the packet is rewritten, and
a value after rewrite.

A flexible I/O fabric can be provided, by enabling exchanges of data and control information between the root complex 8 and the I/O device 5 or between the root complexes 8 in the switch 9 of FIG. 2 or FIG. 3 in this manner.

Figure 13:
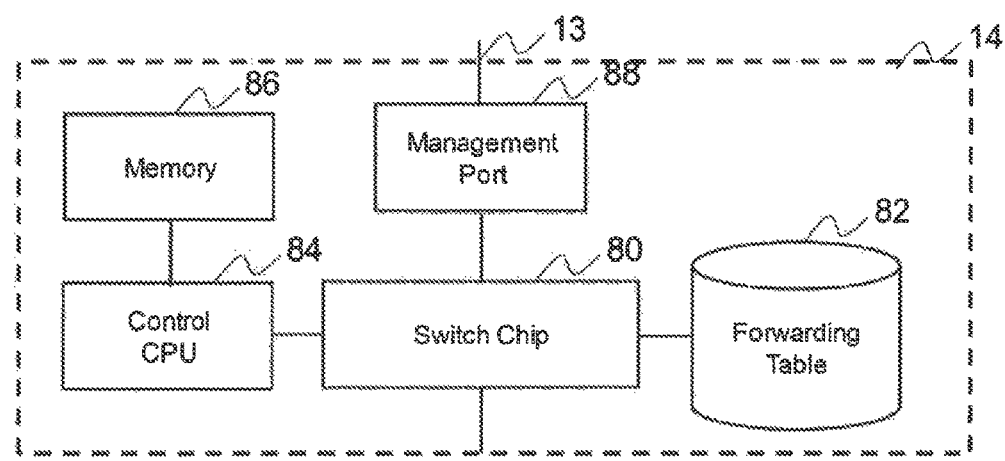
FIG. 13 is a diagram illustrating one example of a switch.

Hereinafter, one example (specific example) of the switch 9 will be described with reference to FIG. 13. In FIG. 13, a switch 14 corresponds to the switch 9 having been described with reference to FIG. 2 to FIG. 4. Referring to FIG. 13, the switch 14 includes a switch chip 80, a forwarding table 82, a control CPU 84, a memory 86, and a management port 88. The switch 14 has the same configuration as that of a network switch such as a common Ethernet (registered trademark) switch, a router, and the like.

The switch chip 80 includes an input/output port of a packet. When a packet is input to the switch chip 80, the switch chip 80 refers to the forwarding table 82 and determines a transmission destination of the packet. In accordance with the determined transmission destination, the switch chip 80 outputs the packet. Alternatively, if necessary, the switch chip 80 rewrites a packet header. The switch chip 80 corresponds to the packet input unit 60, the packet output unit 68, the header analysis unit 62, and the PCI bridge emulation unit 662 and the packet rewrite unit 668 included in the action determination unit 64 in the switch 9 illustrated in FIG. 4, and the forwarding table 82 corresponds to the action determination unit 64 of FIG. 4.

The switch chip 80 is generally implemented by use of an ASIC (Application Specific Integrated Circuit). Therefore, in many cases, only a simple function is provided. Therefore, a complex function such as an emulation function of an I/O device and the like is realized in another block.

The forwarding table 82 may be configured, for example, by use of a TCAM (Ternary Content Addressable Memory). The forwarding table 82 accepts a packet header as an input value, determines whether an entry corresponding to the input value exists, and outputs, when the entry exists, what type of processing is executed for the packet.

The control CPU 84 is a general-purpose CPU that performs control of the switch chip 80, setting of an entry for the forwarding table 82, and the like. In general, a general-purpose OS of Linux (registered trademark) or the like operates on the control CPU 84 and the memory 86. The control CPU 84 includes the function of the switch control unit 70.

Further, the control CPU 84 may be configured by use of a general-purpose CPU. In this case, complex processing difficult to be processed by the switch chip 80 can be realized by using software. For example, functions of the I/O device emulation unit 664 and the inter-CPU bridge emulation unit 666 of FIG. 8 can be realized. In this case, the virtual I/O device management table 6640, the virtual I/O device configuration information management unit 6642, and the virtual I/O device memory space management unit 6656 included in the I/O device emulation unit 664 described with reference to FIG. 11 are realized using, for example, the memory 86. These blocks each include a function of accepting an address as an input and performing reading from or writing to an area corresponding to the address, and therefore, these blocks can be realized by using a memory module used for a main memory or the like of a computer.

The management port 88 is a port for controlling the switch 14 from the outside of the switch 14 and includes an interface function with an external block of the switch control unit 70.

The switch 14 can also be realized by using an OpenFlow switch. All packets of which entry is not registered on the forwarding table 82 are processed by the control CPU 84 or a management system (an OpenFlow controller or the like) of the switch 14 connected to the management port 88.

When the switch 14 is an Ethernet (registered trademark) switch or an OpenFlow switch and is configured as in FIG. 13, the switch 14 can be used as a switch in a configuration that Ethernet (registered trademark) is used to connect a computer and an I/O device enclosure box. In this case, it is possible, by use of a single switch, to emulate an NIC by use of a virtual I/O device instead of an NTB, for realizing exchanges of data and control information between different device trees. In this case, the CPU 2 of a transmission source and the CPU 2 of a transmission destination (see FIG. 2) include virtual I/O devices that emulate NICs, respectively. The switch (e.g. the switch 9) that connects these virtual I/O devices includes a function equivalent to an Ethernet (registered trademark) switch.

The CPU 2 of the transmission source constructs, for example, an IP packet or an Ethernet frame using a socket interface or the like. The constructed IP packet or Ethernet (registered trademark) frame is transmitted to the virtual I/O device (NIC). At that time, in the root complex 8 (see FIG. 2) of the CPU 2 of the transmission source, the IP packet or Ethernet (registered trademark) frame is divided and stored into a payload part of a TLP packet and is transmitted to the virtual I/O device (NIC).

The virtual I/O device (NIC) constructs an IP packet or Ethernet (registered trademark) frame from the received TLP packet and transmits a packet in accordance with a destination address included in the IP packet or Ethernet (registered trademark) frame.

The switch 14 of FIG. 13 refers to a packet header and forwards the packet on the basis of a MAC address.

The virtual I/O device (NIC) of the CPU 2 (see FIG. 2) of the transmission destination stores the received IP packet or Ethernet (registered trademark) frame in the payload part of the TLP packet, inserts therein a header corresponding to a configuration (e.g. ExpEther) using Ethernet (registered trademark) to connect a computer and an I/O device enclosure box, and transmits a packet.

In this manner, it is possible to realize communication between the CPUs 2 (see FIG. 2) using a virtual I/O device (NIC). In the above described example embodiment, when a combination with a configuration using Ethernet (registered trademark) to connect a computer and an I/O device enclosure box is used, a MAC address different from a MAC address used by an I/O interface is assigned to a virtual I/O device (NIC).

According to the above-described example embodiment, it is possible to set, for a switch within an I/O fabric, how to perform communication between nodes configuring the I/O fabric. As a result, the configuration of the I/O fabric can be changed flexibly.

The present invention is suitably applied to a computer in which connection between a CPU and an I/O device can be flexibly changed.

The above-described modes may be described as following supplemental notes (however, not limited the following).
(Supplemental Note 1)

A switching apparatus within a fabric, the switching apparatus including:
- an analysis unit that is configured to extract a header of a received packet and to acquire information of the header;
- a determination unit that is configured to determine an operation for the packet according to information of a type, request source, and destination of a request included in the header; and
- an execution unit including a means configured to execute,
- in accordance with the determined operation, at least one of
  - responding to the request included in the packet,
  - rewriting the packet, and
  - transmitting the packet.

(Supplemental Note 2)

The switching apparatus according to Supplemental Note 1, further comprising a switch control unit, wherein
the execution unit includes:
- means for responding to the request included in the packet,
- means for rewriting the packet, and
- means for transmitting the packet, and the switch control unit is configured to execute at least one of:
- processing for registering, for the determination unit, an identifier of a packet and an identifier indicating an operation executed for the packet,
- processing for setting a configuration of a virtual I/O device to a means, in the execution unit, for responding to the request included in the packet,
- processing for setting at least one of an identifier of the packet, an area where the packet is rewritten, and a value after rewrite, to a means, in the execution unit, for rewriting the packet of the execution unit, and processing for setting an identifier of the packet and an identifier of a transmitting destination of the packet, to a means, in the execution unit, for transmitting the packet.

(Supplemental Note 3)

The switching apparatus according to Supplemental Notes 1 or 2, wherein
the execution unit further includes a virtual I/O device providing means that is configured to respond to a request for a virtual I/O device and provide the virtual I/O device, and wherein
the virtual I/O device providing means includes
a first storage means for storing I/O device setting information based on specifications of an I/O fabric, and
a second storage means for storing data unique to the virtual I/O device.

(Supplemental Note 4)

The switching apparatus according to Supplemental Note 3, wherein
the execution unit performs communication between different I/O fabrics by use of the virtual I/O device providing means.

(Supplemental Note 5)

The switching apparatus according to Supplemental Notes 3 or 4, wherein
the execution unit further includes:
a means configured to capture a packet transmitted during an initialization sequence of a predetermined I/O device connected to the I/O fabric and
a means configured to generate data unique to the I/O device used by the virtual I/O device providing means.

(Supplemental Note 6)

The switching apparatus according to any one of Supplemental Notes 1 to 5, further comprising:
a switch chip that rewrites the packet and forwards the rewritten packet on the basis of the information of the header; and
a controller that controls the switch chip.

(Supplemental Note 7)

The switching apparatus according to any one of Supplemental Notes 1 to 6, wherein
the execution unit further includes:
an I/O device emulation unit that is configured to provide a virtual I/O device for at least one node within an I/O fabric,
a first bridge emulation unit that is configured to provide virtual I/O devices for different device trees of the I/O fabric and realizes exchanges of data and control information,
a second bridge emulation unit that is configured to realize transmission of a packet between a root complex of the I/O fabric and an I/O device and transmission of a packet between the I/O devices,
a packet rewrite unit that is configured to rewrite the packet,
a selection unit that is configured to select, in accordance with the operation determined by the determination unit, any one of the I/O device emulation unit, the first bridge emulation unit, the second bridge emulation unit, and the packet rewrite unit, and
an output interface that is configured to output the packet.

(Supplemental Note 8)

A computer system comprising an I/O fabric, wherein
the I/O fabric includes a switch that comprises:
an analysis unit that is configured to extract a header of a received packet and to acquire information of the header;

a determination unit that is configured to determine an operation for the packet according to information of a type, request source, and destination of a request included in the header; and
an execution unit including a means configured to execute,
in accordance with the determined operation, at least one of
responding to the request included in the packet,
rewriting the packet, and
transmitting the packet.

(Supplemental Note 9)

The computer system according to Supplemental Note 8, wherein
the switch further comprises a switch control unit;
the execution unit includes
means for responding to the request included in the packet,
means for rewriting the packet, and
means for transmitting the packet; and
the switch control unit is configured to execute at least one of:
processing for registering, for the determination unit, an identifier of a packet and an identifier indicating an operation executed for the packet,
processing for setting a configuration of a virtual I/O device to a means, in the execution unit, for responding to the request included in the packet,
processing for setting at least one of an identifier of the packet, an area where the packet is rewritten, and a value after rewrite, to a means, in the execution unit, for rewriting the packet of the execution unit, and
processing for setting an identifier of the packet and an identifier of a transmitting destination of the packet, to a means, in the execution unit, for transmitting the packet.

(Supplemental Note 10)

The computer system according to Supplemental Notes 8 or 9, wherein
the execution unit in the switch further includes a virtual I/O device providing means that is configured to respond to a request for a virtual I/O device and provide the virtual I/O device, and wherein
the virtual I/O device providing means includes
a first storage means for storing I/O device setting information based on specifications of an I/O fabric, and
a second storage means for storing data unique to the virtual I/O device.

(Supplemental Note 11)

The computer system according to Supplemental Note 10, wherein
the execution unit in the switch performs communication between different I/O fabrics by use of the virtual I/O device providing means.

(Supplemental Note 12)

The computer system according to Supplemental Notes 10 or 11, wherein
the execution unit in the switch further includes:
a means configured to capture a packet transmitted during an initialization sequence of a predetermined I/O device connected to the I/O fabric and
a means configured to generate data unique to the I/O device used by the virtual I/O device providing means.

(Supplemental Note 13)

The computer systems according to any one of Supplemental Notes 8 to 12, further comprising:

a switch chip that rewrites the packet and forwards the rewritten packet on the basis of the information of the header; and a controller that controls the switch chip.

(Supplemental Note 14)

The switching apparatus according to any one of Supplemental Notes 8 to 13, wherein the execution unit further includes:

an I/O device emulation unit that is configured to provide a virtual I/O device for at least one node within an I/O fabric, a first bridge emulation unit that is configured to provide virtual I/O devices for different device trees of the I/O fabric and realizes exchanges of data and control information, a second bridge emulation unit that is configured to realize transmission of a packet between a root complex of the I/O fabric and an I/O device and transmission of a packet between the I/O devices, a packet rewrite unit that is configured to rewrite the packet, a selection unit that is configured to select, in accordance with the operation determined by the determination unit, any one of the I/O device emulation unit, the first bridge emulation unit, the second bridge emulation unit, and the packet rewrite unit, and an output interface that is configured to output the packet.

(Supplemental Note 15)

A computer configuration method comprising:

by a switch within a fabric, extracting, when receiving a packet forwarded within the fabric, a header of the packet and acquires information of the header, determining an operation for the packet according to information of a type, request source, and destination of a request included in the header, and executing, in accordance with the determined operation, at least one of responding to the request included in the packet, rewriting the packet, and forwarding the packet.

(Supplemental Note 16)

A program that causes a computer configuring a switch within a fabric to execute:

first processing for extracting a header of a received packet and acquiring information of the header;

second processing for determining an operation for the packet according to information of a type, request source, and destination of a request included in the header; and third processing for executing, in accordance with the determined operation, at least one of responding to the request included in the packet, rewriting the packet, and forwarding the packet.

(Supplemental Note 17)

The program according to Supplemental Note 16 further causes the computer to execute:

fourth processing for executing at least one of:

processing for registering, for the second processing, an identifier of a packet and an identifier indicating an operation executed for the packet, processing for setting a configuration of a virtual I/O device to the processing for responding to the request included in the packet, processing for setting at least one of an identifier of the packet, an area where the packet is rewritten, and a value after rewrite, to the processing for rewriting the packet of the execution unit, and processing for setting an identifier of the packet and an identifier of a transmitting destination of the packet, to the processing for transmitting the packet.

(Supplemental Note 18)

The program according to Supplemental Note 16, wherein the third processing further includes virtual I/O device providing processing for responding to a request for a virtual I/O device and providing the virtual I/O device, and wherein the virtual I/O device providing processing includes storing, by use of a first storage means, I/O device setting information based on specifications of an I/O fabric, and storing, by use of a second storage means, data unique to the virtual I/O device.

(Supplemental Note 19)

The program according to Supplemental Note 18, wherein the third processing further includes performing communication between different I/O fabrics by use of the virtual I/O device providing means.

(Supplemental Note 20)

The program according to Supplemental Notes 18 or 19, wherein the third processing further includes capturing a packet transmitted during an initialization sequence of a predetermined I/O device connected to the I/O fabric and generating data unique to the I/O device used in the virtual I/O device providing processing.

(Supplemental Note 21)

The program according to any one of Supplemental Notes 18 to 20, wherein the third processing further includes:

I/O device emulation processing for providing a virtual I/O device for at least one node within an I/O fabric, a first bridge emulation processing for providing virtual I/O devices for different device trees of the I/O fabric and realizing exchanges of data and control information, second bridge emulation processing for realizing transmission of a packet between a root complex of the I/O fabric and an I/O device and transmission of a packet between the I/O devices, a packet rewrite processing for rewriting the packet, a selection processing for select, in accordance with the operation determined in the second processing, any one of the I/O device emulation processing, the first bridge emulation processing, the second bridge emulation processing, and the packet rewrite processing, and an output processing for outputting the packet from an output interface.

The disclosures of the patent documents and the non-patent document described above are incorporated herein by reference. Modifications and adjustments of the example embodiment and the examples are possible within the scope of the overall disclosure (including claims) of the present invention on the basis of the basic technical concept of the invention. Various combinations and selections of various disclosed elements (including respective elements of each claim, respective elements of each example, respective elements of each drawing, and the like) are possible within the scope of the claims of the present invention. In other words, the present invention, of course, includes various variations and modifications that could be made by those skilled in the art according to the overall disclosure including the claims and the technical ideas.

REFERENCE SIGNS LIST

1 Computer system
2 CPU
3 Memory
4 I/O fabric interface
5 I/O device
6 Fabric switch
7 I/O fabric
8 Root complex
9 Switch
10 Endpoint
11 PCI-Express (registered trademark) fabric
12 Device tree
13 Management link
14 Switch
60 Packet input unit
62 Header analysis unit
64 Action determination unit
66 Action execution unit
68 Packet output unit
70 Switch control unit
80 Switch chip
82 Forwarding table
84 Control CPU
86 Memory
88 Management port
100 Switch
101 Analysis unit
102 Determination unit
103 Execution unit
524 Memory address
526 Requester ID
528 BDF number
536 Type
538 Format
660 Action selection unit
662 PCI bridge emulation unit
664 I/O device emulation unit
666 Inter-CPU bridge emulation unit
668 Packet rewrite unit
670 Packet output interface
672 Action execution unit control interface
674 Action execution processing unit
6640 Virtual I/O device management table
6642 Virtual I/O device configuration information management unit
6644 Configuration information reference unit
6646 BDF number determination unit
6648 Request type determination unit
6654 Memory space reference unit
6656 Virtual I/O device memory space management unit

The invention claimed is:

1. A switching apparatus within a fabric, the switching apparatus comprising:
a processor configured to:
extract a header of a received packet and acquire information of the header;
determine an operation for the packet according to information of a type, request source, and destination of a request included in the header; and
execute, in accordance with the determined operation, at least one of processing for responding to the request included in the packet, processing for rewriting the packet, and processing for transmitting the packet,
wherein the processor is further configured to execute at least one of:
processing for registering an identifier of a packet and an identifier indicating an operation executed for the packet,
processing for setting a configuration of a virtual I/O device in the processing for responding to the request included in the packet,
processing for setting at least one of an identifier of the packet, an area where the packet is rewritten, and a value after rewrite, in the processing for rewriting the packet, and
processing for setting an identifier of the packet and an identifier of a transmitting destination of the packet, in the processing for transmitting the packet.

2. The switching apparatus according to claim 1, wherein the processor is further configured to:
respond to a request for a virtual I/O device and provide the virtual I/O device,
store I/O device setting information based on specifications of an I/O fabric, and
store data unique to the virtual I/O device.

3. The switching apparatus according to claim 2, wherein the processor is further configured to perform communication between different I/O fabrics.

4. The switching apparatus according to claim 2, wherein the processor is further configured to execute:
processing for capturing a packet transmitted during an initialization sequence of a predetermined I/O device connected to the I/O fabric, and
processing for generating data unique to the virtual I/O device.

5. The switching apparatus according to claim 1, wherein the processor is further configured to:
rewrite the packet and forward the rewritten packet using the information of the header.

6. The switching apparatus according to claim 1, wherein the processor is further configured to:
provide a virtual I/O device for at least one node within an I/O fabric,
provide virtual I/O devices for different device trees of the I/O fabric and realize exchanges of data and control information,
realize transmission of a packet between a root complex of the I/O fabric and an I/O device and transmission of a packet between the I/O devices,
rewrite the packet,
select, in accordance with the operation, any one of providing a virtual I/O device for at least one node within an I/O fabric, providing virtual I/O devices for different device trees of the I/O fabric and realizes exchanges of data and control information, realizing transmission of a packet between a root complex of the I/O fabric and an I/O device and transmission of a packet between the I/O devices, and rewriting the packet, and
output the packet.

7. A computer system comprising an I/O fabric, wherein the I/O fabric comprises:
a switching apparatus comprising a processor configured to:
extract a header of a received packet and acquire information of the header;

determine an operation for the packet according to information of a type, request source, and destination of a request included in the header; and execute, in accordance with the determined operation, at least one of:
  processing for responding to the request included in the packet,
  processing for rewriting the packet, and
  processing for transmitting the packet, and wherein the processor is further configured to execute at least one of:
  processing for registering an identifier of a packet and identifier indicating an operation executed for the packet,
  processing for setting a configuration of a virtual I/O device in the processing for responding to the request included in the packet,
  processing for setting at least one of an identifier of the packet, an area where the packet is rewritten, and a value after rewrite, in the processing for rewriting the packet, and
  processing for setting an identifier of the packet and an identifier of a transmitting destination of the packet in the processing for transmitting the packet.

8. A computer configuration method comprising:
by a switch within a fabric,
extracting, when receiving a packet forwarded within the fabric, a header of the packet;
acquiring information of the header;
determining an operation for the packet according to information of a type, request source, and destination of a request included in the header;
executing, in accordance with the determined operation, at least one of:
  responding to the request included in the packet;
  rewriting the packet, and
  forwarding the packet; and
executing at least one of:
  processing for registering an identifier of a packet and an identifier indicating an operation executed for the packet,
  processing for setting a configuration of a virtual I/O device in the processing for responding to the request included in the packet,
  processing for setting at least one of an identifier of the packet an area where the packet is rewritten, and a value after rewrite, in the processing for rewriting the packet, and
  processing for setting an identifier of the packet and an identifier of a transmitting destination of the packet, in the processing for transmitting the packet.

9. A non-transitory computer-readable medium embodying a program causing a computer configuring a switch within a fabric to perform a method comprising:
extracting, when receiving a packet forwarded within the fabric, a header of the packet;
acquiring information of the header;
determining an operation for the packet according to information of a type, request source, and destination of a request included in the header;
executing, in accordance with the determined operation, at least one of:
  responding to the request included in the packet,
  rewriting the packet, and
  forwarding the packet; and
executing at least one of:
  processing for registering an identifier of a packet and an identifier indicating an operation executed for the packet,
  processing for setting a configuration of a virtual I/O device in the processing for responding to the request included in the packet,
  processing for setting at least one of an identifier of the packet, an area where the packet is rewritten, and a value after rewrite, in the processing for rewriting the packet, and
  processing for setting an identifier of the packet and an identifier of a transmitting destination of the packet in the processing for transmitting the packet.

* * * * *

UNITED STATES PATENT AND TRADEMARK OFFICE
CERTIFICATE OF CORRECTION

PATENT NO. : 10,263,891 B2
APPLICATION NO. : 15/318835
DATED : April 16, 2019
INVENTOR(S) : Akira Tsuji Page 1 of 1

It is certified that error appears in the above-identified patent and that said Letters Patent is hereby corrected as shown below:

In the Specification

Column 20, Description of Embodiments, Line 42; Before "second", insert --a--

In the Claims

Column 23, Line 12; In Claim 7, before "identifier", insert --an--

Column 23, Line 22; In Claim 7, after "packet", insert --,--

Column 24, Line 5, (First Occurrence); In Claim 8, after "packet", insert --,--

Column 24, Line 38; In Claim 9, after "packet", insert --,--

Signed and Sealed this
Twentieth Day of August, 2019

Andrei Iancu
*Director of the United States Patent and Trademark Office*